(12) United States Patent
Li et al.

(10) Patent No.: US 7,787,878 B2
(45) Date of Patent: Aug. 31, 2010

(54) METHOD AND SYSTEM FOR ENABLING NUMBER PORTABILITY IN IMS NETWORKS

(75) Inventors: Hui Li, Guang Dong (CN); Kai Wen, Guang Dong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 11/516,946

(22) Filed: Sep. 6, 2006

(65) Prior Publication Data

US 2007/0121890 A1    May 31, 2007

(30) Foreign Application Priority Data

Sep. 6, 2005    (CN) .................. 2005 1 0098402
Sep. 29, 2005    (CN) .................. 2005 1 0108128
Sep. 29, 2005    (CN) .................. 2005 1 0108129

(51) Int. Cl.
*H04W 4/00* (2009.01)
*H04L 12/66* (2006.01)
*H04M 7/00* (2006.01)

(52) U.S. Cl. ............... 455/432.1; 370/352; 379/221.13

(58) Field of Classification Search ............. 370/352, 370/401; 455/433, 551, 436–444; 379/221.13, 379/211.02
See application file for complete search history.

(56) References Cited

U.S. PATENT DOCUMENTS

2006/0234703 A1*  10/2006  Wuthnow et al. ........... 455/433
2008/0133665 A1*  6/2008  Lybeck et al. ............... 709/204

FOREIGN PATENT DOCUMENTS

| CN | 1452376 A | 10/2003 |
|---|---|---|
| CN | 1492701 A | 4/2004 |
| CN | 1642346 A | 7/2005 |
| KR | 20050038868 A | 4/2005 |
| WO | WO 2004075507 A2 * | 9/2004 |

* cited by examiner

*Primary Examiner*—Vincent P Harper
*Assistant Examiner*—Omoniyi A Obayanju
(74) *Attorney, Agent, or Firm*—Brinks Hofer Gilson & Lione

(57) ABSTRACT

A method and system is disclosed for enabling number portability in a communication session between a caller and a callee in an IMS network. When a caller or callee changes her subscription from a first network to a second network, mechanisms are implemented to have the number portability information provided so that the moved caller or callee can still engage in communication sessions using her original public identification number.

21 Claims, 9 Drawing Sheets

METHOD AND SYSTEM FOR ENABLING NUMBER PORTABILITY IN IMS NETWORKS

CROSS REFERENCE

The present application claims the benefit of Chinese Patent Applications 200510098402.0 which was filed on Sep. 6, 2005, 200510108128.0 which was filed on Sep. 29, 2005 and, 200510108129.5, which was filed on Sep. 29, 2005.

BACKGROUND

The present invention relates generally to telecommunications networks, and more particularly to a method and system for enabling number portability in IMS networks.

Traditional telecommunications such as public switched telephone network are circuit-switched networks whereby end-to-end communication is facilitated by uniquely identifying an origination node and a termination node. The origination nodes and the termination nodes are tied to the physical locations of the two networks in which the nodes reside, and the identification numbers such as the telephone numbers corresponding to the nodes are generally not portable. More specifically, a telephone number corresponding to a node connected to a local telephone exchange cannot be ported to another node connected to a different telephone exchange outside the geographical service area of the first local telephone exchange without significant custom engineering.

Number portability is the ability to take an existing identification number, e.g. telephone number, assigned by a first location, and reassign it to a second location. The first and the second locations refer to locations of local telephone exchanges, but more broadly to geographical locations and regions. Such number portability is common and popular in mobile networks, and is often referred as full mobile number portability. Number portability is important, and often critical, in the $21^{st}$ century because as economies advance, mobile phone usage increases, thereby necessitating the need to port numbers from one location to another location. Number portability is also important because it is a tool used by countries and regions to encourage competition amongst service providers by reducing the friction posed to a subscriber as the subscriber contemplates switching service providers.

In traditional number portability schemes, two types of numbers are used: a logical number and a physical number. When a subscriber switches phone service, the logical number is ported to the new service provider. The new service provider, meanwhile, has a new physical number that is corresponding to the logical number. When a telephone call is made to the old physical number, the old physical number is first converted to a logical number, which is used for finding the new physical number in order for locating the geographical and physical locations of the callee. The intelligent platform for converting the physical and the logical numbers has the subscriber information for the callee that is necessary for providing the conversion.

Internet Protocol Multimedia Subsystem (IMS) is a standardized set of architecture specifications of the Third Generation Partnership Project (3GPP) for providing mobile and fixed multimedia services. It uses a voice-over-IP implementation and runs over the Internet Protocol (IP), and is backward compatible with existing phone systems that use packet-switched or circuit-switched technologies. The basic principles of IMS and 3GPP are well known by those skilled in the art and are available at http://www.3gpp.org/specs/numbering.htm.

Because of the way IMS is structured, it is organically flexible enough for the implementation of number portability, i.e. there is no requirement that a physical location be bound by a fixed telephone number, because in the universe of IMS network, there are already a private and a public identification numbers. The public identification number is analogous to the telephone number used in the old PSTN system, which is used publicly for communication sessions. The public identification number is of a Session Initial Protocol (SIP) Universal Resource Identity (URI) or Tel URI format, with Tel URI format used for conventional E.164 numbers. The definitions for Tel URI and SIP URI can be found in RFC3966 and 3261 and 2396.

On the other hand, the private identification number is provided by the network operator of the home network that the user belongs to. The private identification number is the only mechanism for identifying the relation between the subscriber and her home network. By using network access identifier (NAI) scheme, as defined in RFC2486 (http://rfc.net/rfc2486.html, the contents of which are incorporated herein by reference), IMS allows the registration, authentication, management, and billing of a subscriber account to be performed based on the private identification number and independent of the public identification number. As the IMS network uses SIP for the registration process to admit a subscriber into the network, the IMS network relies largely on the private identification number for subscriber authentication and session establishment of a secured channel. Once the registration is completed, the Serving-Call Session Control Function (S-CSCF) of the home network establishes a predetermined relation between the public identification number and the current location of the subscriber. As such, regardless where the location of the subscriber is, either in its home network or any other roaming network, the public identification number can be used to call the subscriber through network routing.

In the IMS network, the S-CSCF needs to process the SIP URI based on its domain information to find out a corresponding Interrogating-CSCF (I-CSCF) that a callee associates with from a domain name and addressing system (DNS). Therefore, it is required that when the network operator provides a public identification number to a subscriber, the domain name of the public identification must be identifiable by the DNS, and the DNS search result must identify the I-CSCF of the domain or network that the operator is operating for the subscriber. As such, the domain portion of the public identification number cannot be dynamically determined, and actually, is pre-fixed. For example, for a user Alice, whose public identification number in a network operated by Operator A may be represented as "sip:alice@operatorA.com", wherein the domain portion "operatorA.com" cannot be dynamically determined or changed. When a subscriber tries to use a public identification number that is not associated with the domain name of the operator, it is currently impossible to change it.

While IMS network is flexible, it neither mandates nor implements number portability. Furthermore, it suffers from the fact that the old network must be involved extensively in order to forward calls or call sessions. For example, it requires the old network to provide unconditional call forwarding function to the ex-subscriber. This unconditional call forwarding is not only taxing but highly inefficient. Furthermore, in order to facilitate unconditional call forwarding, the old network has to maintain a database of the mapping between the logical number and the physical number Therefore, desirable in the art of telephone network designs are additional method and system for providing more efficient number portability without taxing the old network, especially for IMS networks.

SUMMARY

In view of the foregoing, the following provides a method for enabling number portability in a communication session between a caller and a callee in IMS networks.

In various embodiments, a method and system is disclosed for enabling number portability in a communication session between a caller and a callee in an IMS network. When a caller or callee changes her subscription from a first network to a second network, mechanisms are implemented to have the number portability information provided so that the moved caller or callee can still engage in communication sessions using her original public identification number. In one embodiment, the caller or callee uses a universal public identification number that is not associated with any operators.

The construction and method of operation of the invention, however, together with additional objects and advantages thereof will be best understood from the following description of specific embodiments when read in connection with the accompanying drawings.

DESCRIPTION

The following will provide a detailed description of a method and system for providing number portability in IMS networks according to various embodiments of the present invention.

Figure 1:
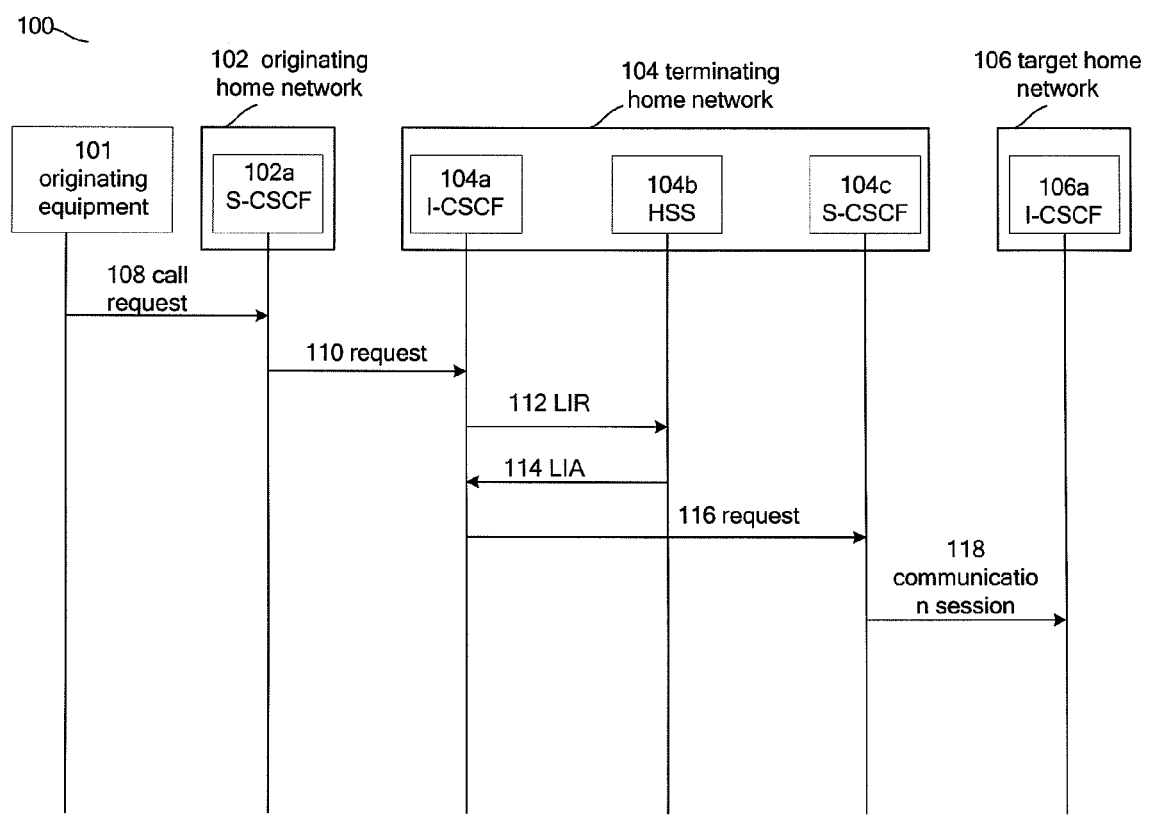
FIG. 1 presents a diagram showing protocols for a call to be forwarded in a conventional design implementing number portability.

FIG. 1 presents a diagram 100 showing how a call is routed in a conventional design implementing number portability. Conventional designs are based on session redirection, which is well described in Chapter 5.11.5.1, Technical Specification Group Services and System Aspects, 3GPP (File: 3G TS 23.228 version 2.0.0, the contents of which are incorporated herein by reference.) Session redirection essentially provides a mechanism whereby an initial call request is redirected to a new destination based on a known set of subscriber profile information. The number portability service must forward the call session to a new network unconditionally.

Assume that a mobile caller wants to initiate a session with a mobile callee whose service provider has been changed. The mobile caller, having an originating equipment 101, first makes a call request 108 to a servicing node such as a Serving-Call Session Control Function (S-CSCF) 102a of an originating home network 102, which belongs to the service provider or network operator for the mobile caller. The S-CSCF 102a then sends a request 110 to a terminating home network 104, which corresponds to the former service provider of the callee. An interrogating-CSCF (I-CSCF) 104a, having received the request 110, makes a location information request (LIR) 112 to a home subscriber server 104b, which then replies by sending a location information answer (LIA) 114 to the I-CSCF 104a. The I-CSCF 104a then contacts, through a request 116, to its own S-CSCF 104c, which then establishes a communication session 118 with the I-CSCF 106a of a target home network 106, which is where the mobile callee presently resides. By first interrogating the terminating home network 104 and using the terminating home network 104 to send the communication request to the target home network 106, by means of a session redirection scheme, number portability is enabled as the mobile callee can still be reached despite having changed service provider from the one associated with the terminating home network 104 to the one associated with the target home network 106.

However, the above scheme suffers from the fact that the communication session is initiated from the terminating home network, which sets up unconditional forwarding and must maintain subscriber profile information on file in order to process the session redirection. More specifically, in addition to the "border element" of the terminating network (i.e., the I-CSCF), almost all elements in the terminating network have to be involved. For example, the I-CSCF always has to route the INVITE message to its S-CSCF and vice versa for returning data. This reduces the efficiency of the network resources.

Figure 2:
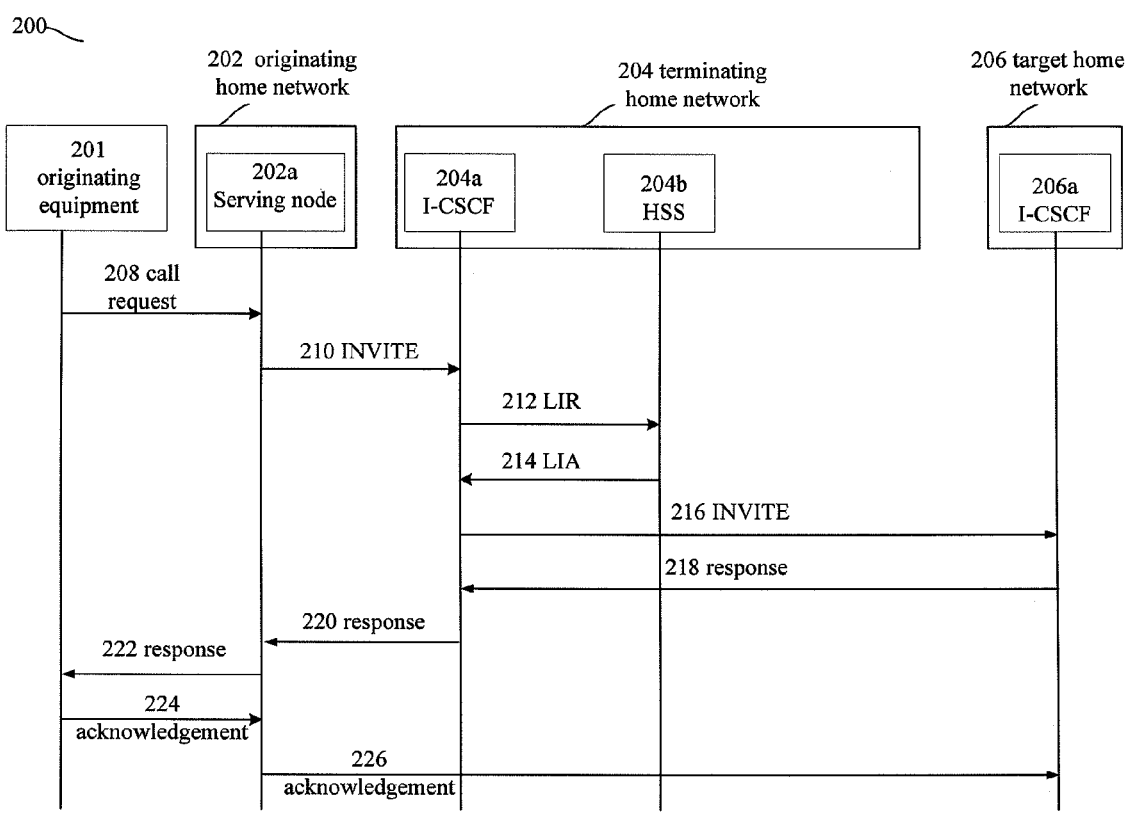
FIG. 2 presents a diagram showing a protocol flow for routing a call in a system with number portability in accordance with one embodiment of the present invention.

FIG. 2 presents a diagram 200 showing how a call is routed in a design implementing number portability in accordance with one embodiment of the present invention. In the invention, a session is made directly from the originating home network through a border element of a terminating network initially to the target home network, thereby eliminating the substantial involvement of the terminating home network afterwards in providing the number portability service. This is significant because it eliminates the requirement that the terminating home network has to contribute a significant of amount of network resource even though the subscriber is no longer using the terminating home network's service.

In this embodiment, a caller calls a mobile callee whose service provider or operator has been changed and who has a new public identification number assigned by the new operator while maintaining the original public identification number. The caller, having an originating equipment 201, first makes a call request 208 (e.g., an INVITE message) to an originating home network 202. The caller can be a mobile caller, in which case the originating equipment 201 may be a mobile phone or a Proxy-CSCF, and a serving node 202a of the originating home network 202 may be an S-CSCF. The caller can also be a PSTN caller, in which case the originating equipment 201 may be an ISDN phone and the serving node 202a of the originating home network 202 may be the PSTN's entry node to mobile networks.

The serving node 202a then sends a request 210 such as an INVITE message to a terminating home network 204, which corresponds to the former service provider of the mobile callee. An I-CSCF 204a, having received the request 210, makes a LIR 212 to a home subscriber server (HSS) 204b, which then replies by sending a LIA 214 to the serving node 204a (e.g., an S-CSCF). The HSS used the public identification number contained in the LIR, conducts a database search, and figured that the number portability service is registered. More importantly, the LIA 214 contains corresponding new public identification number in the new network/domain of the mobile callee. At this point with the routing information, the serving node 204a such as an I-CSCF processes the expanded attribute value pair (AVP), which contains the new public identification number and its associated domain name, and conducts an DNS search and finds the serving node (e.g., I-CSCF) of the IMS system operated by the new operator. Through a communication request 216 (e.g., an INVITE message), the I-CSCF 204a contacts I-CSCF 206a of a target home network 206, where the mobile callee resides. Such INVITE message can be used to determine whether a record-route header needs to be added so that the terminating home network will be involved in further communications for the number portability service. In other words, if no record-route header is addes, the I-CSCF 204a will only handle the initial transaction and will not involve the terminating home network for any further communication transactions. Once the presence of I-CSCF 206a and the mobile caller's registration are verified, signals 218, 220, and 222 containing a confirmatory message (e.g., the "response" messages) are sent back to the originating equipment 201. When the originating equipment 201 receives the "response" message, it sends an acknowledgement signal 224 to the serving node 202a, which then sends an acknowledgement signal 226 to the I-CSCF 206a of the target home network 206. By the time the acknowledgement signal 226 reaches the I-CSCF 206a, a communication session between the originating equipment 201 and the I-CSCF 206a of the target home network 206 is established, thereby successfully connecting the originating equipment 201 to the mobile callee's network. This scheme is different from the scheme provided in the conventional design in FIG. 1 because after the communication session's initial handshake, the subsequent handshakes are performed directly between the originating equipment 201 and the mobile callee's new network, bypassing the substantial involvement of the terminating home network 204 and thus eliminating overhead associated with passing through the terminating home network 204.

In a more specific example, the mobile callee has switched from operator A to operator B. The original IMS public identification number for the mobile callee was callee@operatorA.com, while the new public identification number for the mobile callee at the new service provider is callee@operatorB.com. However, due to the number portability function, the original public identification number is still maintained, and callers still want to be able to call callee by using the original callee@operatorA.com as the calling handle.

The original public identification number is used to locate the former service provider, which is operator A. The caller contacts, by making the request 208 to, the S-CSCF 202a of the caller's service provider, and the S-CSCF 202a makes the request 210 to the I-CSCF2 204a of the callee's former service provider based on the original public identification number. At the former service provider, the I-CSCF2 204a finds out from the HSS 204b that the subscriber callee@operatorA.com, has "subscribed" to number portability service that resolves to the new identifier callee@operatorB.com. This can be done by an LIR message 212 and a responding LIA message 214 between the I-CSCF 204a and HSS 204b. While the I-CSCF 204a still uses the conventional LIR message to query the HSS to find the S-CSCF, the HSS uses the original public identification number to search an information database, and provides the new public identification number in the responding LIA message. The I-CSCF2 204a then sends the communication request 216 to I-CSCF 206a in the new network/domain operated by operator B, which was identified based on the identification relationship between the new public identification number and its corresponding I-CSCF. Because the communication request 216 is merely a request such as an INVITE message and not a session, there is no requirement of mandating a record-route header in the INVITE message. After responding messages 218, 220, and 222 are passed back through the terminating home network to the originating equipment 201, acknowledgement signals 224 and 226 are passed from the originating equipment 201 to the I-CSCF 206a of the target home network 206 directly, skipping the terminating home network, thereby forming a communication link between the caller and the callee without taxing the terminating home network 204, which is also the former service provider of the callee. As such, a communication session is generated even as the caller uses the old public identification number of the callee. During the process of establishing the eventual communication link between the caller's originating home network and the callee's target home network, the IMS network of the callee's former service provider is bypassed, thereby improving efficiency and reducing unnecessary taxing of the former service provider's networks due to number portability.

Figure 3A:
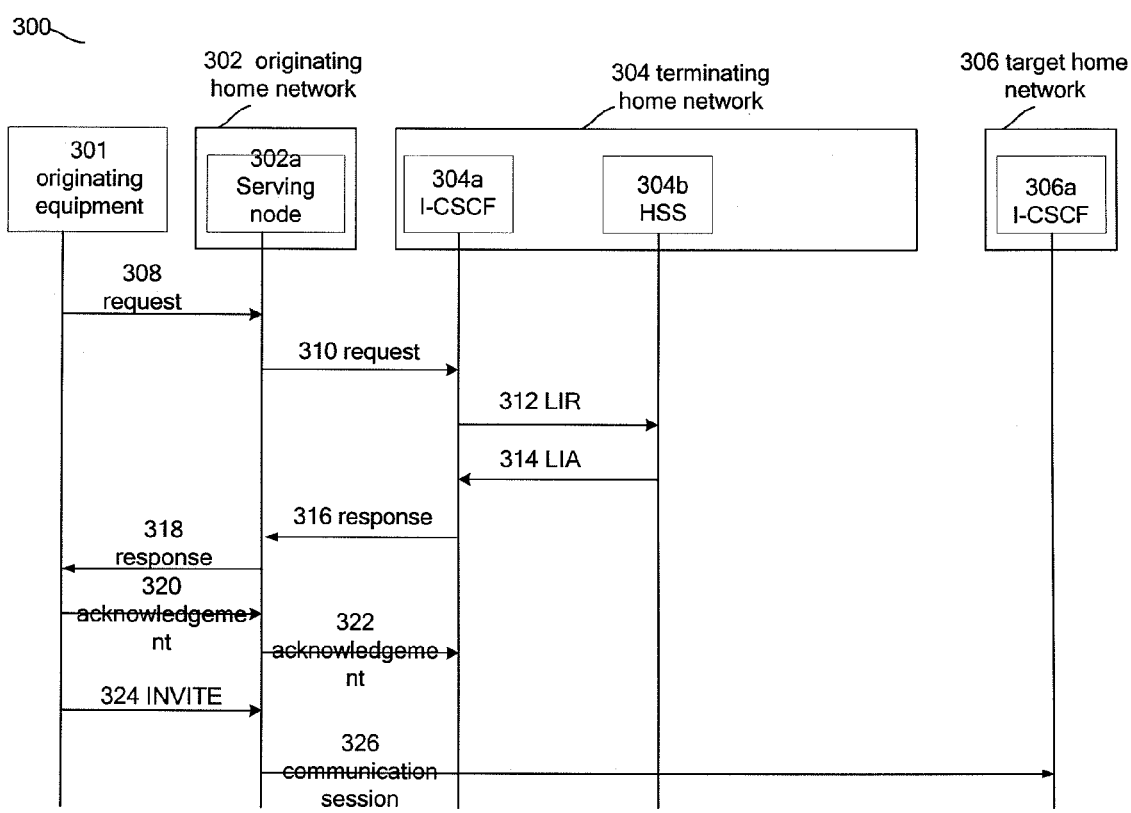
FIG. 3A presents a diagram showing a protocol flow for routing a call in a system with number portability in accordance with another embodiment of the present invention.

FIG. 3A presents a diagram 300 showing how a call is routed in a communication system implementing number portability in accordance with another embodiment of the present invention. In this embodiment, session information is directly sent back to the originating equipment by means of a series of messages. The originating equipment then initiates a session directly to the target home network, thereby eliminating the requirement that the session be continued through the terminating home network after the initial handshake transaction.

A caller first calls a mobile callee whose service provider has been changed. The caller, having an originating equipment 301, first makes a call request 308 to a serving node 302a of an originating home network 302. The caller can be a mobile caller, in which case the originating equipment 301 may be a mobile phone and the serving node 302a of the originating home network 302 may be an S-CSCF. The caller can also be a PSTN caller, in which case the originating equipment 301 may be an ISDN phone and the serving node 302a of the originating home network 302 may be the PSTN's entry node to mobile networks. The serving node 302a then sends a request 310 such as an INVITE message to a terminating home network 304, which is associated with the former service provider of the mobile callee. An I-CSCF 304a of the terminating home network, having received the request 310, makes a LIR 312 to a HSS 304b, which then replies by sending a LIA 314 to the serving node 304a. In this reply, the HSS 304b may specify how it wants the I-CSCF to handle the initiated session involving the number portability. For example, the HSS 304b may want the I-CSCF 304a to respond to the originating home network with a message indicating the identification of the new I-CSCF of the target network, or the HSS 304b may instruct the I-CSCF 304a to contact the I-CSCF of the target network. The LIA 314 contains the call routing information of the mobile callee, who is now serviced by a new operator in a target home network. At this point, the serving node 304a sends a first "response" message 316 to the serving node 302a, which in turn sends a second "response" message 318 to the originating equipment 301. When the originating equipment 201 receives the "response" message 318, it sends an acknowledgement signal 320 to the serving node 302a, which then sends an acknowledgement signal 322 to the I-CSCF 304a of the terminating home network 304 to acknowledge that the routing information is received. It is understood that the routing information includes at least the address of the I-CSCF of the target home network so that the caller can communicate with the new network directly. More specifically, the originating equipment 301 sends a request 324 (e.g., and INVITE message) to the serving node 302a such as an S-CSCF, which establishes a communication session 326 with an I-CSCF 306a of the target home network 306, thus establishing a session between the originating equipment 301 and the I-CSCF 306a of the target home network 306. This scheme is different from the scheme provided in the conventional design in FIG. 1 because the call handshake is effectively performed directly between the originating equipment 301 and the mobile callee's network, bypassing the terminating home network 304 and thus eliminating overhead associated with passing through the terminating home network 304.

In a more specific example, the mobile callee has switched from operator A to operator B. The original public identification number for the mobile callee was callee@operatorA.com, while the new public identification number for the mobile callee at the new service provider is callee@operatorB.com. However, if numbers are truly portable between service providers, caller still wants to call callee by using callee@operatorA.com as the calling identification.

The caller makes the request 308 to the S-CSCF 302a of the caller's service provider, and the S-CSCF 302a makes the request 310 to the I-CSCF2 304a of the callee's former service provider. At the former service provider, the I-CSCF2 304a finds out from the HSS 304b that the subscriber callee@operatorA.com, has "subscribed" to the number portability service that resolves to the new identifier callee@operatorB.com. The new identifier is then sent back to I-CSCF2 304a. After "response" messages are passed back to the originating equipment 301, a communication session is established between the caller and the callee through requests 324 and 326 without taxing the IMS network of the terminating home network 304, which is also the former service provider of the callee. As such, a session is generated even as the caller uses the old public identification number of the callee, and, during the process of establishing the eventual communication link between the caller's originating home network and the callee's target home network, the IMS network of the callee's former service provider is bypassed, thereby improving efficiency and reducing unnecessary taxing of the former service provider's networks due to number portability.

It is further contemplated that the public identification numbers can be designed to have two types: the universal and operator specific identification numbers. The universal type (U-PUID) contains no operator specific information such as its domain or network information, and may be defined and provided by a non-operator entity such as a national standard organization, but it can also be assigned by the operator but still not associated with any operator specific information (e.g., bob@bob.com). The universal identification numbers are used to identify a subscriber, and not necessarily used for routing (although they can be in some designs). The operator specific type (I-PUID) is provided by the operators and identifies operator related information (e.g., bob@operatorA.com), and is largely used for locating the subscriber and routing messages. As such, the I-PUID can be assigned flexibly, e.g., based on subscribers, call sessions, or domains/networks.

Figure 3B:
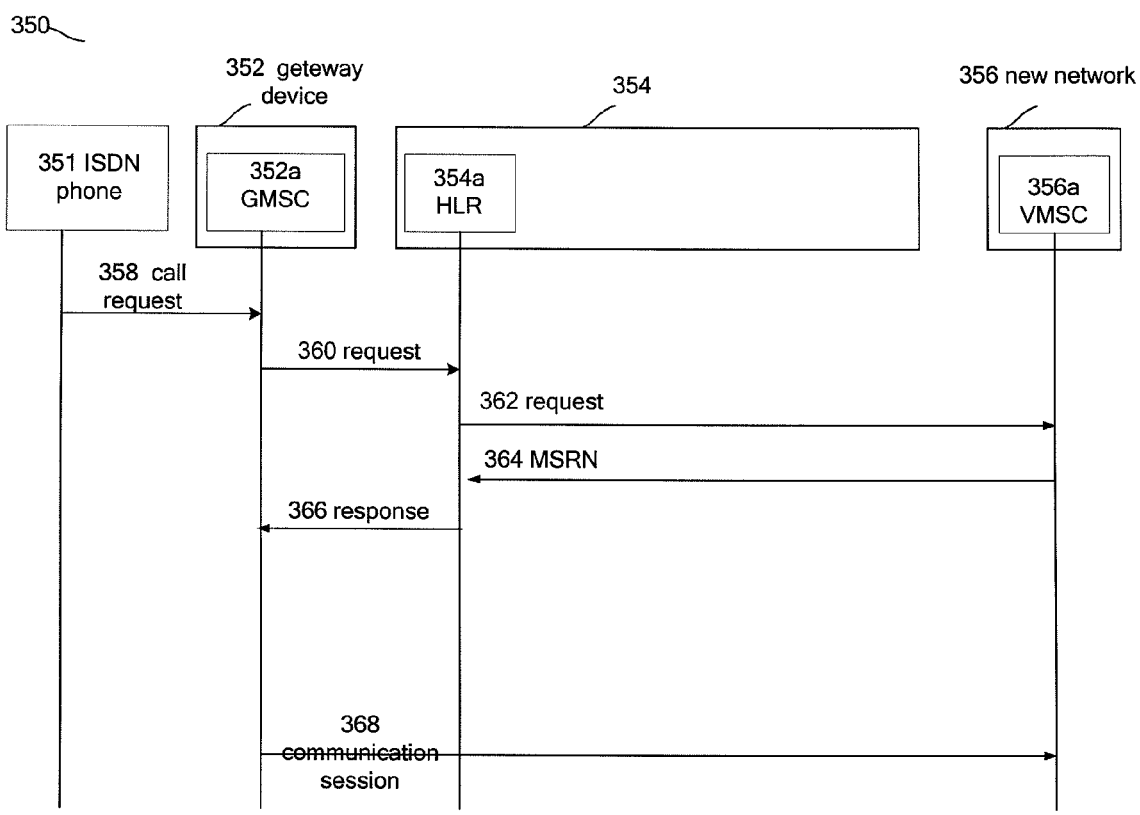
FIG. 3B presents a diagram showing a protocol flow for routing a call in a system with number portability in accordance with yet another embodiment of the present invention.

The diagram 300 in FIG. 3A is modified into a diagram 350 in FIG. 3B by implementing a user location function (ULF) module such as a home location register (HLR), which can perform the search between the original and new public identification numbers in lieu of the HSS 304b in FIG. 3A. In this example, it is demonstrated that the number converting function is performed by the caller's network as opposed to the callee's network. The ULF module can be a device that is held independent of the operators, but it can be handled by the operators under their control. The physical devices to perform the ULF can be HLR, HSS, DNS, ENUM, or SLF depending on the network designs. The protocols used by such ULF module can be any ones that are appropriate or acceptable by the industry. When a caller calls a callee, the U-PUID of the callee is used by the caller's network to determine whether it should be converted to a corresponding I-PUID. For example, the U-PUID can be of a particular format so that the caller's network can identify that the callee employs a number portability service so that the caller's network has to search for the appropriate network of the callee. In another example, the caller can still call the old U-PUID to the terminating home network, and get a response therefrom indicating that this number is not associated with the terminating home network. If so, the caller's network searches for information from the ULF. The callee's U-PID is sent to the ULF module to search for a corresponding I-PUID. Once the I-PUID is returned from the ULF module, the call session between the caller and callee can be established directly.

Referring to FIG. 3B, for example, when a caller is calling from a PSTN network, e.g. from an ISDN phone 351, to a subscriber in a call session (CS) based network, it may establish a call request 358 with a gateway device 352, which includes a gateway mobile switching center (GMSC) 352a. Based on the universal public identifier number callee used (e.g., U-PUID), a request 360 is sent to a HLR 354a to check its corresponding operator specific I-PUID. Using the U-PUID as the callee identifier number, the HLR module 354a sends a request 362 to a visited mobile switching center (VMSC) 356a that services the callee at the moment, which is in a new network 356. Once located, a mobile station roaming number (MSRN) 364, which is a form of an I-PUID, is then returned by the VMSC 356a to the HLR 354a, which then encapsulates the MSRN 364 in a response message 366 to the GMSC 352a. This I-PUID or MSRN in this case is then used to initiate a communication session 368 with the VMSC 356a.

Figure 3C:
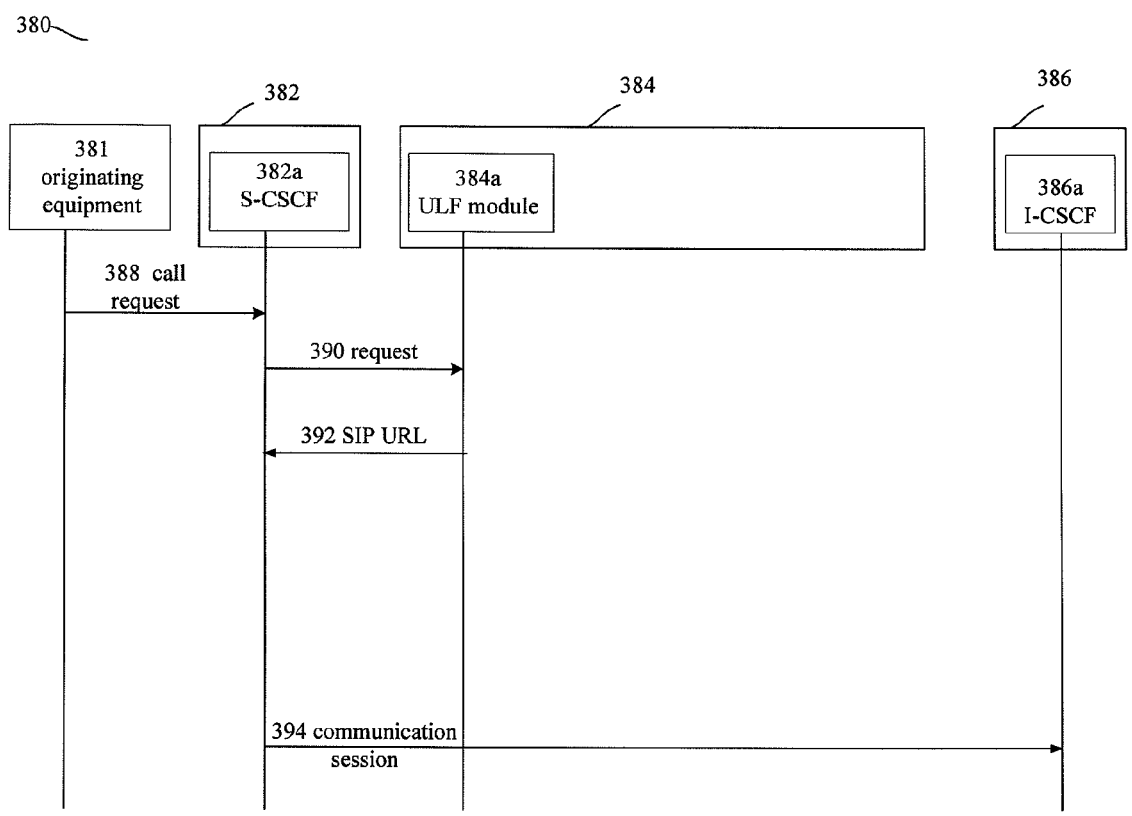
FIG. 3C presents a diagram showing a protocol flow for routing a call in a system with number portability in accordance with yet another embodiment of the present invention.

The diagram 350 in FIG. 3B can be further modified to function within the IMS network as shown in FIG. 3C. In this configuration, one IMS subscriber calls another using its E.164 identifications. For instance, the U-PUID may be 1388888888, and its I-PUID obtained from a specific operator A is s1234@operatorA.com. The system 380 is identical to the system 350 except that the GMSC 352a and the VMSC 356a are replaced by a S-CSCF 382a and an I-CSCF 386a, which are implemented in networks 382 and 386 respectively, while the ULF functions of the HLR 354a can be performed by an electronic number (ENUM) server 384a if needed, which is another form of a ULF module 384.

In this scenario, a call request 388, made by an originating equipment 381 uses a universal public identification number of the callee in the format of telephone uniform resource identifier (Tel URI) such as 1388888888. The S-CSCF 382*a* determines that the ULF module needs to be checked for finding the operator specific public identification number for the call session based on the universal public identification number. A request 390 is made to the ULF module such as an ENUM server, and the corresponding operator specific public identifier number 392 (e.g., in the format of a session initiation protocol (SIP URI) such as s1234@operatorA.com) may be returned from the ULF module. Both the request 362 and the return of the MSRN 364 in FIG. 3B are not necessary as the ULF module 384*a* should now have a database for looking up the I-PUID ready to be returned to the S-CSCF 382*a*. With the returned I-PUID, the S-CSCF 382*a* can now establish a communications session 394 directly to I-CSCF via the IMS network.

Similarly, if an IMS caller calls a callee who is also an IMS user using callee's SIP URI (e.g., smith@universal.tel), the ULF module returns the operator specific public identification number based on its association with the universal public identification number.

Figure 3D:
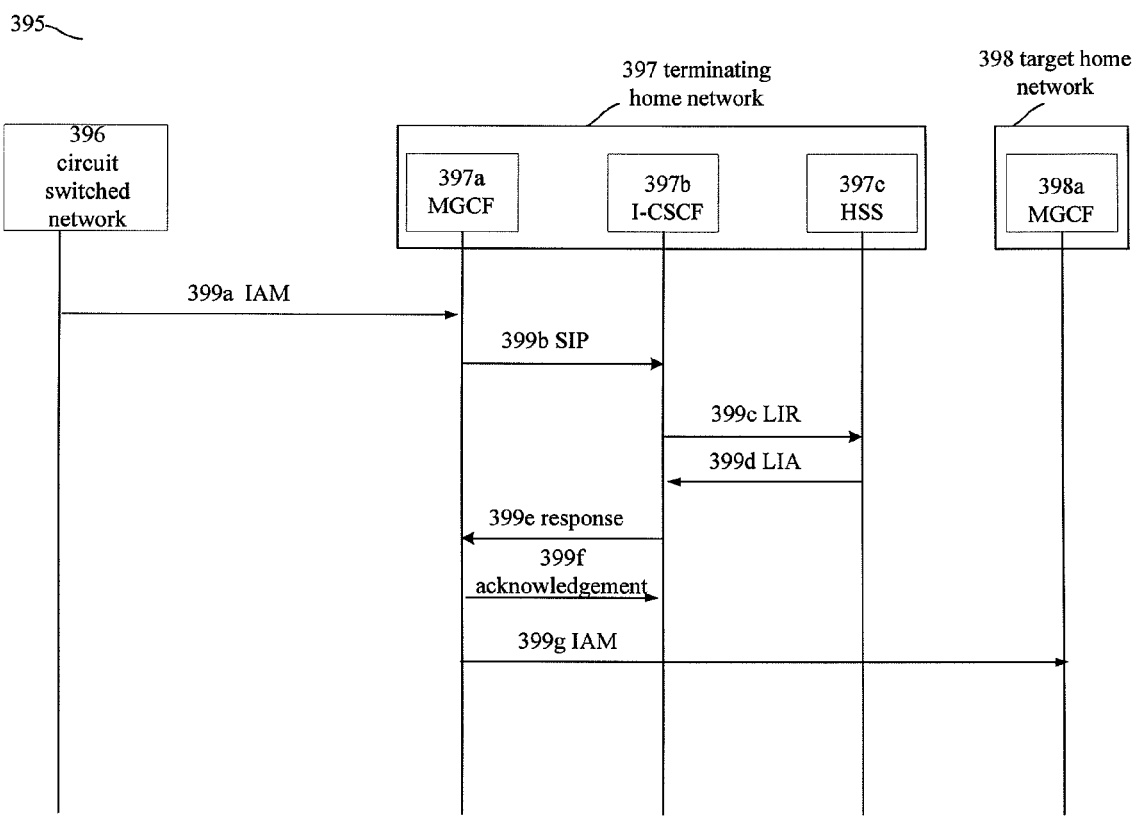
FIG. 3D presents a diagram showing a protocol flow for routing a call in a system with number portability in accordance with yet another embodiment of the present invention.

FIG. 3D presents a diagram 395 with a protocol flow for using the IMS network as the preferred solution for number portability even though both the caller and the callee are in circuit switched networks whereupon any IMS lookup of the callee's identity returns an E.164 number that must be routed through E.164 gateways such as a media gateway controller function (MGCF) according to another embodiment of the present invention. In this scenario, a caller attempts to call from a circuit switched network 396 to a callee. For example, the callee's E.164 number is +1 972 555 1234, corresponding to the old operator. An initial address message (IAM) 399*a* is sent to the MGCF 397*a* of a terminating home network 397. The format of this IAM 399*a* is compatible with the common signaling protocols in public switched telephone networks (PSTN). The MGCF 397*a* then converts the IAM 399*a* into a SIP message 399*b*, which is then sent to an I-CSCF 397*b*. The I-CSCF 397*b*, upon receiving the SIP message 399*b*, inquires the callee's location by interrogating a ULF module such as an HSS 397*c* of the terminating home network 397 through a LIR message 399*c*. This interrogation involves attempting to look up the callee's current number by using the callee's old E.164 number, i.e. +1 972 555 1234. The HSS 397*c* returns a LIA message 399*d* to the I-CSCF 397*b*. The LIA 399*d* contains the callee's new E.164 number (e.g. +1 214 555 9988, corresponding to the new operator). Because I-CSCF 397*b* cannot route E.164 calls to a circuit switched network, the I-CSCF 397*b* sends a "response" message 399*e* back to the MGCF 397*a*, which first acknowledges the receipt of the "response" message 399*e* via an acknowledgement signal 399*f* and then sends an IAM 399*g* to the MGCF 398*a* of the target home network 398, which belongs to the new operator. Thus, the caller is able to reach the callee even though the caller only has the callee's old number. More generally, number portability is provided through the IMS network for telephone calls that are circuit switched at both ends. It is understood that the public identification number can either be in the SIP URI format or the Tel URI format depending on the system design, but the conversion between them can be carried out by some predetermined modules such as the ULF module (e.g., HSS or Application Server module).

Figure 4:
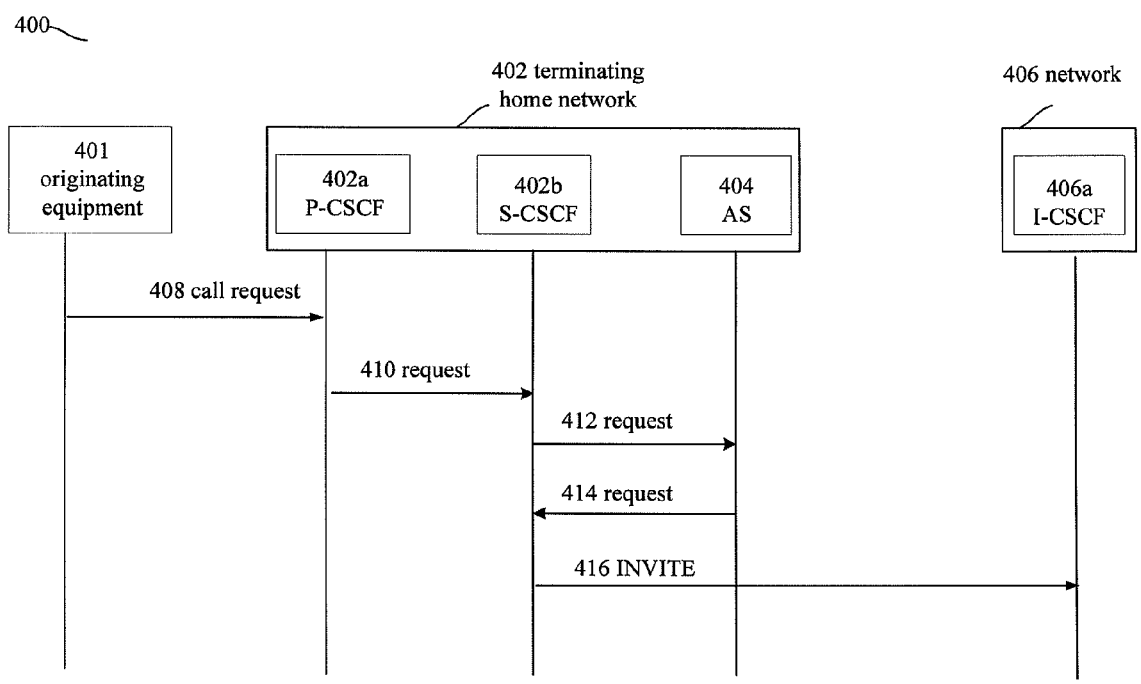
FIG. 4 presents a diagram showing a protocol flow for routing a call in a system with number portability in accordance with yet another embodiment of the present invention.

FIG. 4 presents a diagram 400 showing how a call is masqueraded for a caller who has changed her operator in a communications system implementing number portability in accordance with another embodiment of the present invention. In this embodiment, the caller whose service provider has been changed wishes to use her original identification, not the new I-PUID from the new operator, to initiate the call with a caller. In a more specific example, the mobile caller has switched from operator A to operator B. The original public identification number for the mobile caller was caller@operatorA.com, while the new public identification number for the mobile caller at the new service provider is caller@operatorB.com. However, if numbers are truly portable between service providers, caller still wants to call a callee while be identified by the callee as caller@operatorA.com.

The caller, having an originating equipment 401, first makes a call request 408 to an originating home network 402. The caller in this embodiment is a mobile caller, whereby the originating equipment 401 is a mobile phone and a serving node 402*a* of the originating home network 402 may be a P-CSCF. The serving node 402*a* may also contain a S-CSCF 402*b*. The P-CSCF examines the content of the P-Preferred Identity header in the request message to check whether it is a registered number. If so, the value of the P-Asserted-Identity header may be altered to link with the identification of the caller in the P-Preferred-Identity header. Otherwise, the P-CSCF fills the P-Asserted-Identity as the default identification.

The serving node 402*a* then forwards the request message 412 to S-CSCF 402*b*. The S-CSCF examines P-Asserted-Identity header, and confirms the registration of the number. Once confirmed, the request message is forwarded to an application server 404 to complete other processes for initiating a call (e.g., billing recording) through two messages 412 and 414. The two messages 412 and 414 also inform the S-CSCF the number portability related information such as the original I-PUID of the caller. The identification in P-Asserted-Identify header may then be replaced to the original I-PUID of the caller. The S-CSCF 402*b* then forwards the message (e.g., the INVITE message) to an I-CSCF 406*a* of a network 406 where the callee is in, thus establishing a communication session 416 between the originating equipment 401 and the I-CSCF 406*a* used by the callee. This scheme allows any new identification number established by the new service provider with the old identification number that is allowable due to number portability.

It is understood by those skilled in the art that in all of the previous embodiments, the both the old and the new identification numbers are just examples and can be represented by E.164-compliant telephone numbers (e.g. +1 972 555 1234). In the example illustrated in FIG. 4, caller@operatorA.com can be, as an example, replaced by +1 972 555 1234, which is the old number to be ported to a new service provider, while caller@operatorB.com can be, as an example, replaced by +1 214 555 1234, which is the new number to be masqueraded when the subscriber at the new service provider attempts to make a new telephone call. In the above embodiments, a RFC822-compliant email address is interchangeable with an E.164-compliant telephone number as the identifier number. In that respect, the serving nodes 202*a*, 302*a* and 402*a* become circuit-switched elements that are gateways to the mobility environment.

It is understood that each IMS user can have one or more public identification number (IMPUs), which may be stored in an IMS subscriber identity module (ISIM) of a mobile terminal, and in HSS database. The IMPU can be the universal public identification number or the operator specific public identification number. The universal public identification number can also be a dynamically designed ID such as the company specific IMPU mentioned above. For example, a subscriber can have an IMPU (e.g., an U-PUID bob@companyA.com) as his special IMPU that is only used for identifying him, but still has a normally assigned I-PUID bob@operatorA.com associated therewith and to be used for routing messages.

When a subscriber moves on to a new operator, the original operator does not service the subscriber any more, but has to maintain all the data related to the subscriber so that call forwarding or number portability features can be implemented. Consistent with the embodiments disclosed above, the present disclosure provides a domain location function (DLF) or a user location function (ULF) module that locates subscriber identification information. For the purpose of this application the term DLF or ULF are used exchangeably.

It is assumed that when the subscriber engages a new operator, in addition to his original IMPU, he may be assigned with a new operator specific identification number I-PUID. The DLF module primarily provides the network/domain information based on the IMPU of the subscriber. The DLF module can be an independent module that is not associated with or controlled by a particular operator, and can be a publicly accessible module. The DLF's searching mechanism or protocols can be DNS, ENUM, SLF or any other similar industry acceptable mechanism. The search function provided by the DLF module can be categorized into two large types. One, the DLF module provides the new I-PUID used for routing based on the original IMPU (which can be considered as a de facto U-PUID), which is no longer used for routing but may be used for identification. In addition, the DLF module further provides the network address that the subscriber currently belongs to based on the old IMPU.

For registration, if the mobile terminal has the original IMPU stored in the ISIM module, this IMPU is used for a registration request. The contract database maintained by the operator may contain IMPU, or it can also include the registration information based on the combination of IMPU and the new I-PUID. Upon successful registration with the network, the S-CSCF module will send the IMPU back to the mobile terminal to confirm its registration (e.g., as the default user identification). If the mobile terminal has the new I-PUID, the mobile terminal can use I-PUID for registration as well. The registration database may use I-PUID only or registration based on the combination of the I-PUID and IMPU. Similarly, the S-CSCF may return certain user specific confirmation information to the mobile terminal.

For registration database, it is contemplated that when a subscriber switches from one operator to another, there are several ways to keep the old I-PUID useful for future communications. For example, in the new network, the old I-PUID is still listed as a separate public identification number for the subscriber. For example, if bob@operatorA.com is the old one, and bob@operatorB.com is the new one, in the HSS of the new network, both are listed as the I-PUIDs. As such, the old I-PUID can be used independently for registration and other communications purposes. As such, the subscriber actually can initiate a call using the old I-PUID in the new network, but cannot be called by the old I-PUID in the new network.

Alternatively, a combination of the old and new I-PUIDs can be used as an implicit registration group. For example, the operator of the new network can "attach" or associate the old I-PUID to the new I-PUID. Even if the HSS of the new network may be limited not to allow the old I-PUID to be used for registration, but with the "attachment" of the two numbers, as long as the registration using the new I-PUID is completed, the registration for any other identifiers associated with the new I-PUID such as the old I-PUID is also deemed to concurrently completed. Therefore, the subscriber can use his old I-PUID such as bob@operatorA.com to initiate as well as to receive a call in the network operated by operator B. This actually brings a lot of nice options for the subscribers. For example, if a company is not in the operator's business, but would like to use some unique identification numbers for its employees, any operator can just associate the requested identification numbers with its normally assigned I-PUID. For example, subscriber Bob now can use bob@company.com to initiate or receive a call as long as its current operator associates bob@company.com with the current I-PUID.

Once the registration process is completed by the mobile terminal, the S-CSCF can determine when to provide the number portability feature. For example, when a caller calls a callee using its original IMPU, the request reaches the S-CSCF in the network servicing the caller. Based on the callee's IMPU, the S-CSCF determines whether the callee has subscribed to the number portability feature. For instance, the domain information associated with the IMPU can be used to determine whether the callee is in another domain and whether it has subscribed to the number portability. Once determined, the S-CSCF communicates with the DLF module using the callee's original IMPU to search for the current domain/network information of the callee.

If the DLF module returns the new operator specific public identification number such as I-PUID, the IMS network that the caller is in uses the I-PUID to replace the Request-URI of relevant SIP signals, examine the identity represented by the I-PUID, detect the new network that the callee belongs to, and ask messages to be routed to the new network. Alternatively, the Request-URI portion of the SIP signals remain unchanged, the identity represented by I-PUID is examined to obtain the new network address for the callee. All future messages are routed to the callee's current network. In this alternative method, the subscriber contract database accessible by the DLF module shall include information for the identity represented by the I-PUID.

If the DLF module returns the network/domain name that the callee is currently in, the Request-URI portion of the SIP messages remain unchanged. The network address is used for routing the call related messages. Similarly, the subscriber contract database accessible by the DLF module shall include information for the identity represented by the I-PUID.

Figure 5:
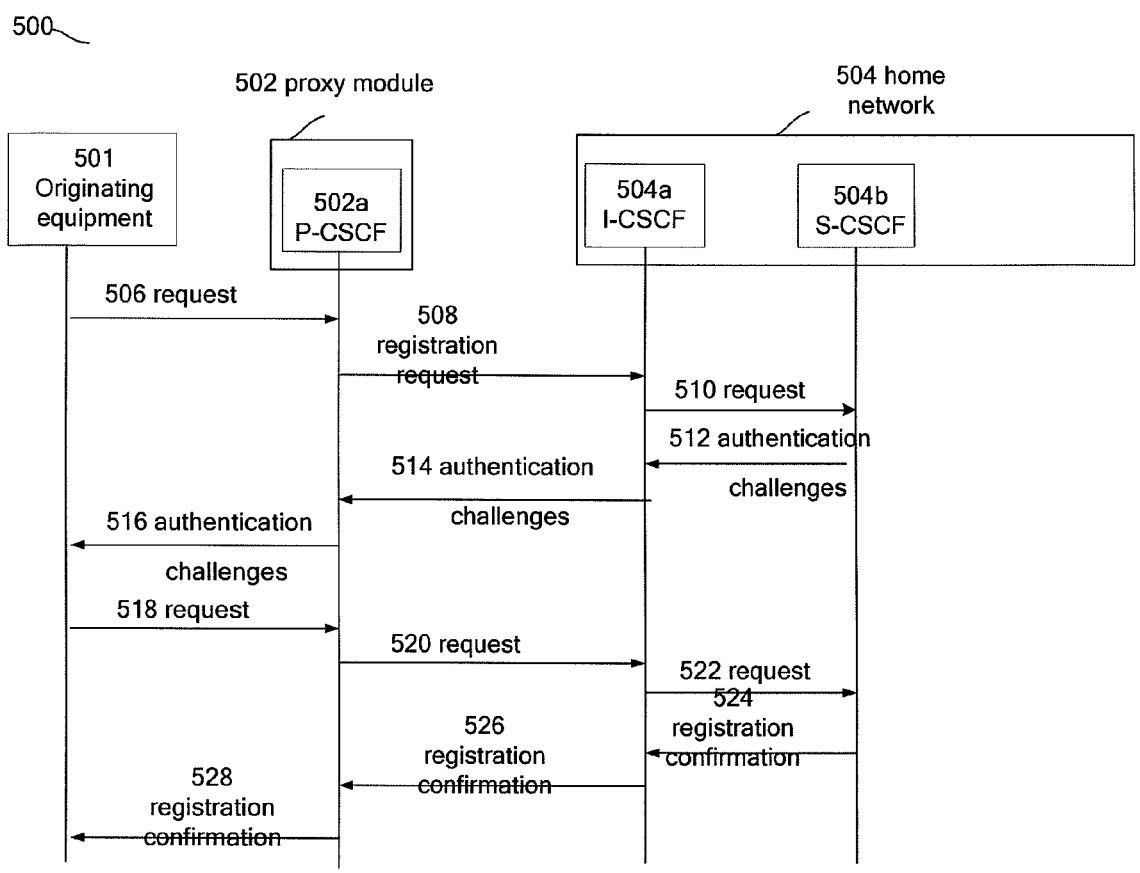
FIG. 5 presents a diagram showing a protocol flow for registering a user terminal in a new network in accordance with embodiments of the present invention.

Referring to FIG. 5, a flow diagram 500 is shown to illustrate the registration process according to one embodiment of the present invention. An originating equipment 501 first connects by sending a request 506 to a proxy CSCF 502*a* (P-CSCF) in a proxy module 502 of a visiting network/domain. The request 506 uses essentially a I-PUID provided by the visiting network in the format of an SIP URI for registration. After the P-CSCF checks the home network or domain associated with the I-PUID in the request 506, it understands that the home network that the subscriber belongs to is not the visiting network. This can be done by using DNS protocols to obtain the home network information so that an I-CSCF 504*a* of the home network can be identified. Another registration request 508 is sent from the P-CSCF 502*a* to an I-CSCF 504*a* of the home network 504. The I-CSCF 504*a* contacts a related HSS to check on the subscriber registration status, and based on the returned information from the HSS, the address of a particular S-CSCF is identified. Another request 510 is sent by the I-CSCF 504*a* to a corresponding S-CSCF 504*b* of the home network, which processes and authenticates the request with the assistance of the HSS accessible through the same network. A chain of authentication challenges 512, 514, and 516 is then sent back to the originating equipment 501 for authentication. The originating equipment 501, responding to the authentication challenges, re-sends a registration request via a chain of requests 518, 520, and 522 to the S-CSCF 504b through P-CSCF and I-CSCF. The S-CSCF further coordinates with the HSS to check the registration status of the subscriber (e.g., using the I-PUID in the form of an SIP URI) and completes the registration. The S-CSCF 504b acknowledges the registration of the originating equipment 501 via a chain of "registration confirmation" messages 524, 526, and 528. The registration confirmation messages can carry, in at least one portion of its header (e.g., P-Associated-URI header), registration related subscriber identity information. For example, the default public user identity IMPU can be the first URI on the list of URIs present in the P-Associated-URI header in the response to the REGISTER request. At this point, authentication and registration is completed. The originating equipment 501 in the visiting network is therefore registered with the HSS in its home network for the number portability feature so that any caller calls her using her old IMPU will have the call routed to the visiting network.

Figure 6:
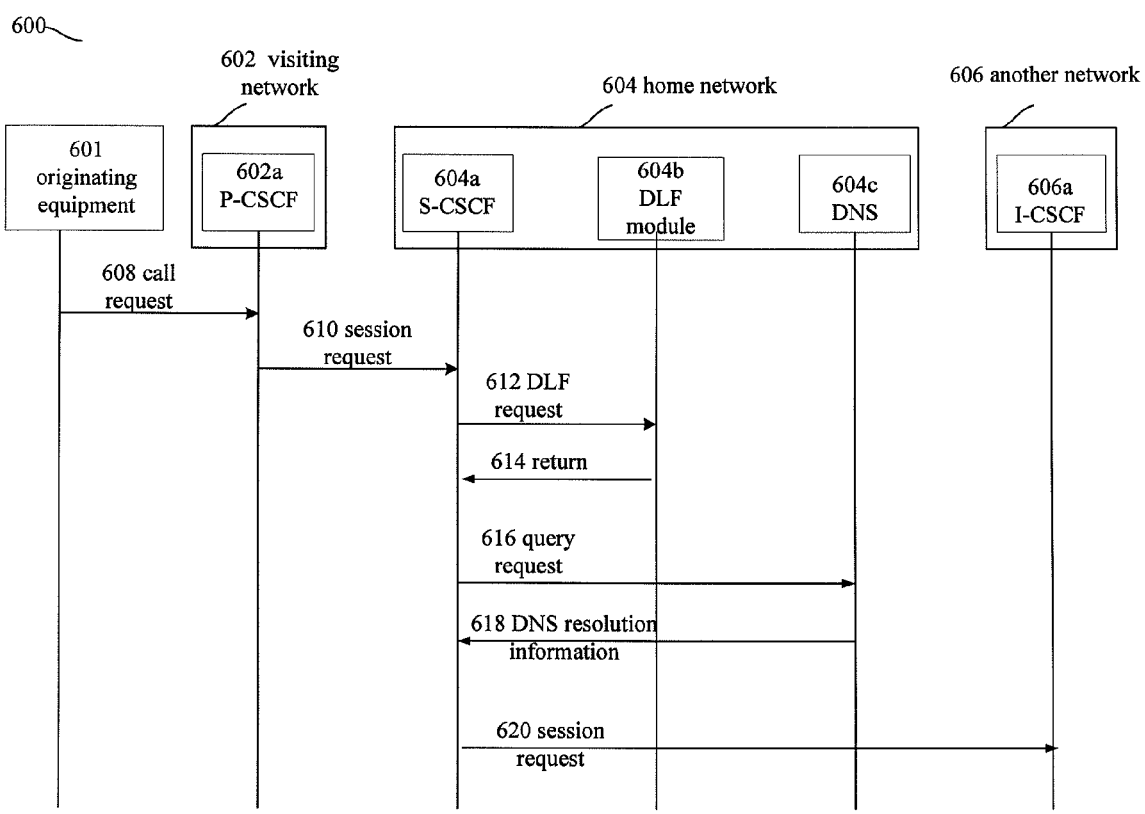
FIG. 6 presents a diagram showing a protocol flow for originating a call by a user terminal in a new network in accordance with embodiments of the present invention.

FIG. 6 presents a diagram 600 showing how a user terminal originates a call in a visiting network in accordance with embodiments of the present invention. It is assumed that a caller is now in a predetermined visiting network 602, and belongs to a home network 604 and the callee is in another network 606. When in the network 602, an originating equipment 601 first initiates a call request 608 with the P-CSCF 602a of the network 602 based on the IMPU assigned to the caller. Since the P-CSCF 602a has the information to identify the S-CSCF of the terminating home network of the caller based on the caller registration information, the request 608 triggers another session request 610 to the S-CSCF 604a of the home network 604 through a request 610. The S-CSCF 604a determines whether the callee is a number portability subscriber. If so, a domain location function (DLF) request 612 is made to a DLF module 604b. The DLF module 604b then returns a corresponding I-PUID of the callee assigned by the network that callee is in a return message 614 to the S-CSCF 604a. Upon determining that the I-PUID corresponds to the current network, the S-CSCF further communicates with a domain name service (DNS) server 604c through a query request 616. The DNS server 604c then responds with a DNS resolution information 618 providing the address of the I-CSCF of the network of the callee. Armed with the DNS resolution information 618 and the I-PUID, the S-CSCF 604a initiates a handshake with an I-CSCF 606a of the network 606 through a session request 620. From this point on, the caller can contact the callee in its network directly. By using DLF and DNS to resolve the location of the callee, number portability can be implemented without fully relying on the status of the terminating home network.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for enabling number portability in a communication session between a caller and a callee when the callee moves from a terminating home network to a target home network, the method comprising:
    contacting a border element of the terminating home network of a first service provider by a serving node from an originating home network upon receiving a call request initiated by the caller, the call request comprising at least a first public identification number associated with the callee;
    obtaining a second public identification number associated with the callee and assigned by the target home network of a different service provider from a user location function module by the border element based on the first public identification number for communication session redirection;
    based on the second public identification number, performing a handshake between the originating home network and the target home network of the different service provider to establish a direct communication between the originating home network and the target home network of the different service provider without involving the terminating home network of the first service provider, wherein the terminating home network of the first service provider communicates one or more messages with the target home network of the different service provider, the one or more messages indicate that the terminating home network of the first service provider does not need to stay involved for communication session redirection in future communications between the caller and the callee, and
    wherein the terminating home network of the first service provider and the target home network of the different service provider are IMS networks.

2. The method of claim 1, wherein the border element of the terminating home network and the user location function exchanges an LIR and a LIAS messages for providing the second public identification number.

3. The method of claim 1, wherein the first or second public identification number is of a telephone uniform resource identification format.

4. The method of claim 1, wherein the first or second public identification number is of a session initial protocol uniform resource identification format.

5. The method of claim 1 wherein the first public identification number is a universal public identification number that is not associated with any operator.

6. The method of claim 1 wherein the user location function module is operated independent of operators of the originating, terminating, or target home network.

7. The method of claim 1 wherein the originating network is a call session based (CS) network, and the border element further includes a media gateway control function module (MGCF) that converts a first initial address message (IAM) message to a session initial protocol (SIP) message.

8. The method of claim 7 wherein the MGCF contacts the target network through a second IAM message after obtaining the second public identification number.

9. A system for enabling number portability in a communication session between a caller and a callee when the callee moves from a terminating home network to a target home network, the system comprising:
    an originating home network having a serving node, the serving node configured to contact a border element of the terminating home network of a first service provider upon receiving a call request initiated by the caller, wherein the call request comprises at least a first public identification number associated with the callee;

the border element of the terminating home network of the first service provider configured to obtain a second public identification number associated with the callee for routing messages based on the first public identification number from a user location function module;

the originating home network and the target home network of a different service provider configured to perform a handshake between the originating home network and the target home network of the different service provider to establish a direct communication between the originating home network and the target home network of the different service provider without involving the terminating home network of the first service provider based on the second public identification number, wherein the terminating home network of the first service provider is further configured to communicate one or more messages with the target home network of the different service provider, the one or more messages indicate that the terminating home network of the first service provider does not need to stay involved for communication session redirection in future communications between the caller and the callee, and wherein the terminating home network of the first service provider and the target home network of the different service provider are IMS networks.

10. The system of claim 9, wherein the border element of the terminating home network and the user location function exchanges an LIR and a LIAS messages for providing the second public identification number.

11. The system of claim 9, wherein the first or second public identification number is of a telephone uniform resource identification format.

12. The method of claim 9, wherein the first or second public identification number is of a session initial protocol uniform resource identification format.

13. The system of claim 9, wherein the first public identification number is a universal public identification number that is not associated with any operator.

14. The system of claim 9, wherein the user location function module is operated independent of operators of the originating, terminating, or target home network.

15. The system of claim 9, wherein the originating network is a call session based (CS) network, and the border element further includes a media gateway control function module (MGCF) that converts a first initial address message (IAM) message to a session initial protocol (SIP) message.

16. The system of claim 15, wherein the MGCF contacts the target network through a second IAM message after obtaining the second public identification number.

17. The system of claim 9, wherein the terminating home network is further configured to receive a confirmatory message from the target home network and send the confirmatory massage to the originating home network;

the originating home network is further configured to receive the confirmatory massage and send an acknowledgement signal to the target home network to establish a direct communication between the originating home network and the target home network without involving the terminating home network.

18. The method of claim 1, wherein performing a handshake between the originating home network and the target home network to establish a direct communication between the originating home network and the target home network without involving the terminating home network comprising:

based on the second public identification number, communicating, by the terminating home network, the one or more messages with the target home network;

receiving, by the terminating home network, a confirmatory message from the target home network and sending the confirmatory massage to the originating home network;

sending, by the originating home network an acknowledgement signal to the target home network to establish a direct communication between the originating home network and the target home network without involving the terminating home network.

19. The method of claim 1, wherein the one or more messages indicates an exclusion of the border element for communication session redirection.

20. The method of claim 1, wherein the user location function module directs whether the border element should stay involved for communication session redirection.

21. The system of claim 9, wherein the user location function module directs whether the border element should stay involved for communication session redirection.

* * * * *